US010190027B2

(12) United States Patent
Takamori

(10) Patent No.: US 10,190,027 B2
(45) Date of Patent: *Jan. 29, 2019

(54) HOT MELT ADHESIVE

(71) Applicant: HENKEL AG & CO. KGAA, Duesseldorf (DE)

(72) Inventor: Ai Takamori, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,846

(22) Filed: Aug. 21, 2018

(65) Prior Publication Data
US 2018/0355229 A1 Dec. 13, 2018

Related U.S. Application Data

(63) Continuation of application No. 15/166,386, filed on May 27, 2016, now Pat. No. 10,077,383, which is a continuation of application No. PCT/JP2014/081919, filed on Nov. 26, 2014.

(30) Foreign Application Priority Data

Nov. 29, 2013 (JP) ................................ 2013-248600

(51) Int. Cl.
| | | |
|---|---|---|
| C09J 129/14 | (2006.01) | |
| C09J 7/35 | (2018.01) | |
| C09J 7/21 | (2018.01) | |
| B31F 5/04 | (2006.01) | |
| B32B 27/10 | (2006.01) | |
| B32B 27/32 | (2006.01) | |
| B32B 29/08 | (2006.01) | |
| C08L 23/02 | (2006.01) | |
| C08L 23/08 | (2006.01) | |
| C08L 53/02 | (2006.01) | |
| C08L 93/04 | (2006.01) | |
| C08L 91/06 | (2006.01) | |
| C09J 191/06 | (2006.01) | |

(52) U.S. Cl.
CPC ............... *C09J 129/14* (2013.01); *B31F 5/04* (2013.01); *B32B 27/10* (2013.01); *B32B 27/32* (2013.01); *B32B 29/08* (2013.01); *C08L 23/02* (2013.01); *C08L 23/0815* (2013.01); *C08L 23/0869* (2013.01); *C08L 53/025* (2013.01); *C08L 93/04* (2013.01); *C09J 7/21* (2018.01); *C09J 7/35* (2018.01); *B32B 2255/12* (2013.01); *B32B 2307/306* (2013.01); *B32B 2405/00* (2013.01); *C08L 91/06* (2013.01); *C08L 2205/035* (2013.01); *C09J 191/06* (2013.01); *C09J 2400/283* (2013.01); *C09J 2409/00* (2013.01); *C09J 2423/00* (2013.01); *C09J 2423/04* (2013.01); *C09J 2423/10* (2013.01); *C09J 2431/00* (2013.01); *C09J 2433/00* (2013.01); *C09J 2491/00* (2013.01)

(58) Field of Classification Search
CPC ..... C09J 129/14; C09J 7/35; C09J 7/21; C09J 191/06; C09J 2400/283; C09J 2409/00; C09J 2423/00; C09J 2423/04; C09J 2423/10; C09J 2431/00; C09J 2433/00; C09J 2491/00; B31F 5/04; B32B 27/10; B32B 27/32; B32B 29/08; B32B 2255/12; B32B 2307/306; B32B 2405/00; C08L 23/02; C08L 23/0815; C08L 23/0869; C08L 53/05; C08L 93/04; C08L 91/06; C08L 2205/035
USPC ........................................................ 524/512
See application file for complete search history.

(56) References Cited

FOREIGN PATENT DOCUMENTS

| EP | 1125980 A1 | 8/2001 |
|---|---|---|
| JP | 4913247 A | 2/1974 |
| JP | 6346279 A | 2/1988 |
| JP | 2000-303387 A | * 10/2000 |
| JP | 2000302922 A | 10/2000 |
| JP | 2000303387 A | 10/2000 |
| JP | 2008527067 A | 7/2008 |
| JP | 2008214539 A | 9/2008 |
| JP | 2012177009 A | 9/2012 |
| WO | 2009081877 A1 | 7/2009 |
| WO | 2012005270 A1 | 1/2012 |

OTHER PUBLICATIONS

JP 2000-303387A—machine translation (Year: 2000).*
JP 4913247 A—Derwent ID—JP 49013247A—Derwent Acc No. 1974-68451V—Feb. 5, 1974.

* cited by examiner

*Primary Examiner* — Ling Siu Choi
*Assistant Examiner* — Ronald Grinsted
(74) *Attorney, Agent, or Firm* — Sun Hee Lehmann

(57) ABSTRACT

The object of the present invention is to provide a hot melt adhesive which is less likely to cause stringing and has excellent thermal stability, and further has excellent adhesion, in particular adhesion to a paper substrate. The present invention relates to a hot melt adhesive comprising: (A) a polar functional group-modified polymer, (B) a butyral resin, (C) an olefin-based polymer, and (D) a tackifier resin.

4 Claims, No Drawings

HOT MELT ADHESIVE

FIELD OF INVENTION

The present invention relates to a hot melt adhesive and more specifically to a hot melt adhesive which has excellent adhesion to various substrates and is particularly suitable for assembling paper substrates such as corrugated cardboards.

BACKGROUND OF THE INVENTION

A hot melt adhesive is a solvent-less adhesive, which is heat-melted, applied to an adherend, and then solidified by cooling to exhibit adhesion, and thus a hot melt adhesive enables instantaneous adhesion and rapid adhesion, and is applicable in wide variety fields such as paper processing, woodworking, hygienic materials, and electronics.

As a base polymer for the hot melt adhesive, for example, an ethylene-based copolymer such as an ethylene-vinyl acetate copolymer (hereinafter also referred to as "EVA") and an ethylene-ethylacrylate copolymer (hereinafter also referred to as "EEA"), an olefin-based resin such as polyethylene, polypropylene, amorphous polyalphaolefin (hereinafter also referred to as "APAO"), a styrene-based block copolymer (e.g., styrene-isoprene-styrene-based block copolymer (hereinafter also referred to as "SIS") and styrene-butadiene-styrene-based block copolymer (hereinafter also referred to as "SBS")) and a synthetic rubber of hydrogenated product thereof, and polyurethane are widely used, depending on intended use of the hot melt adhesive.

Among these hot melt adhesives, a hot melt adhesive including an ethylene-based copolymer as base polymer is often used in a paper processing field such as book binding and packaging, and a woodworking field.

For application of a hot melt adhesive, a dedicated coating device called hot melt applicator is often used. The hot melt applicator has a nozzle, i.e., a discharge opening. The hot melt adhesive heated to about 120 to 190° C. is discharged from the tip of the nozzle for application to an adherend.

In application of the hot melt adhesive, a hot melt adhesive string may sometimes occur between the tip of nozzle and the adherend. The occurrence of string is due to the stringing properties of a hot melt adhesive, soiling the nozzle and the adherend. Accordingly, adhesive manufacturers have important responsibility for developing a hot melt adhesive having less stringing.

In Japanese Patent Laid-Open Nos. 2008-527067 and 2008-214539, ethylene (polyolefin)-based hot melt adhesives with the purpose of reducing stringing are described. Japanese Patent Laid-Open No. 2008-527067 discloses a hot melt adhesive including ethylene/$C_3$-$C_{20}$ α-olefin copolymer as base polymer, for use in packaging, book binding, woodworking and the like (refer to claim 1 and "0013"). Japanese Patent Laid-Open No. 2008-214539 discloses an olefin hot melt adhesive which includes a "stringing reducing agent" which is formed by modifying an olefin with unsaturated polycarboxylic acid, or acid anhydride or ester thereof (refer to claim 1 and "0024" Table 1), for use in packaging and book binding (refer to "0001" and "0028").

Reducing stringing of a hot melt adhesive has been more severely required year by year. Particularly, users of thick paper such as corrugated cardboards and cartons earnestly require the reduction in stringing. Although the hot melt adhesives of Japanese Patent Laid-Open Nos. 2008-527067 and 2008-214539 have reduced stringing properties, it cannot be said that the performance severely required by the users is sufficiently satisfied with the adhesives.

Japanese Patent Laid-Open No. 2012-177009 discloses an ethylene-based hot melt adhesive in which the composition of ethylene/carboxylic acid ester is adjusted to a specific range and which can thus reduce stringing at a high level and which has excellent heat resistance and thermal stability (see claim 1, [0011], [Table 1] and [Table 2]). However, demands for hot melt adhesives from users have been increasing over the years. The hot melt adhesive of Japanese Patent Laid-Open No. 2012-177009 cannot be said to satisfy the users' high demand for properties of adhesion to paper.

Also, cartons having a surface coated with a chemical have been frequently used to package products recently to add a high quality feeling to the packaging of products. Therefore, hot melt adhesives are required to have a certain level of adhesion even to the coating surface of cartons. It is an urgent need in the hot melt adhesive industry to develop an ethylene-based hot melt adhesive capable of reducing stringing, having excellent thermal stability and also having excellent properties of adhesion to paper.

SUMMARY OF INVENTION

An object of the present invention is to provide a hot melt adhesive capable of reducing stringing, having excellent thermal stability and having excellent adhesion to paper, in particular, to cartons the surface of which is coated with a chemical.

The present invention and preferred embodiments of the present invention are as follows.
1. A hot melt adhesive comprising:
    (A) a polar functional group-modified polymer,
    (B) a butyral resin,
    (C) an olefin-based polymer, and
    (D) a tackifier resin.
2. The hot melt adhesive according to the above item 1, wherein the polar functional group-modified polymer (A) comprises at least one selected from a polar functional group-modified conjugated diene-based polymer and a polar functional group-modified olefin-based polymer.
3. The hot melt adhesive according to the above item 1 or 2, wherein the polar functional group is at least one functional group selected from an acid anhydride group, a maleic acid group, a carboxyl group, an amino group, an imino group, an alkoxysilyl group, a silanol group, a silyl ether group, a hydroxyl group and an epoxy group.
4. The hot melt adhesive according to any one of the above items 1 to 3, wherein the olefin-based polymer (C) comprises ethylene-based copolymer.
5. The hot melt adhesive according to the above item 4, wherein the ethylene-based copolymer comprises a copolymer of ethylene and an olefin having 3 to 20 carbon atoms.
6. The hot melt adhesive according to the above item 5, wherein the copolymer of ethylene and an olefin having 3 to 20 carbon atoms comprises a copolymer of ethylene, propylene and 1-butene.
7. The hot melt adhesive according to any one of the above items 1 to 6, further comprising (E) a wax.
8. The hot melt adhesive according to the above item 7, wherein the wax (E) comprises a Fischer-Tropsch wax.
9. A paper product produced by applying the hot melt adhesive according to any one of claims 1 to 8.

In the present invention, an olefin-based hot melt adhesive contains a butyral resin, and therefore has increased adhesion to paper. Further, the olefin-based hot melt adhesive contains a polar functional group-modified polymer, and therefore the compatibility of the butyral resin with other components is improved. As a result, a hot melt adhesive capable of reducing stringing and having excellent thermal stability and adhesion, in particular, adhesion to paper substrates can be provided.

The present invention provides a hot melt adhesive suitable for application to paper substrate, particularly to corrugated cardboards and carton paper, and having an excellent adhesion.

DETAILED DESCRIPTION OF THE INVENTION

The hot melt adhesive of the present invention comprises at least (A) a polar functional group-modified polymer, (B) a butyral resin, (C) an olefin-based polymer and (D) a tackifier resin, and preferably further comprises (E) a wax. Hereinafter, these may be described below as a "(A) component," a "(B) component," a "(C) component", a "(D) component" and "(E) component" respectively. A "modified polymer" means to include both (i) one in which a functional group is provided after a polymer is obtained and (ii) one in which a functional group is introduced in the process of polymerization.

<(A) Polar Functional Group-Modified Polymer>

In the hot melt adhesive of the present invention, the use of the polar functional group-modified polymer (A) ((A) component) increases the compatibility between the butyral resin (B) and other components, such as the olefin-based polymer (C) and tackifier resin (D), and improves the pressure-sensitive adhesiveness, adhesion, thermal stability and the like.

The polar functional group-modified polymer (A) used in the present invention refers to a polymer having at least one polar functional group. The position at which the polar functional group is introduced is not particularly limited, and may be at an end of the polymer or at inside of the polymer other than the ends of the polymer. The polar functional group may be provided to an obtained polymer, or introduced in the process of polymerizing a monomer. In the present specification, a butyral group-containing polymer is classified into the (B) component, not into the (A) component.

Examples of the "polar functional group" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic anhydride group, a maleic acid group, an amino group and an epoxy group are preferred.

The polar functional group-modified polymer (A) is not particularly limited, and preferably comprises at least one selected from a polar functional group-modified conjugated diene-based polymer (A1) and a polar functional group-modified olefin-based polymer (A2). Two or more of these may be used in combination. These will be described in detail below.

(A1) Polar Functional Group-Modified Conjugated Diene-Based Polymer

A "conjugated diene-based polymer" refers to a polymer having a structural unit based on a conjugated diene compound (conjugated diene unit).

Here, the "conjugated diene compound" means a diolefin compound having at least a pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene and 1,3-hexadiene. 1,3-Butadiene and 2-methyl-1,3-butadiene are particularly preferred. These conjugated diene compounds may be used alone or in combination.

In the present invention, the conjugated diene-based polymer may have, in addition to the conjugated diene unit, structural units based on other monomers. Examples of other monomers include vinyl-based aromatic hydrocarbons, vinyl nitrile and unsaturated carboxylate esters.

In the present invention, the "conjugated diene-based polymer" is not particularly limited as long as the hot melt adhesive targeted by the present invention can be obtained. For example, a copolymer in which a vinyl-based aromatic hydrocarbon and a conjugated diene compound are block-copolymerized, that is, one having a vinyl-based aromatic hydrocarbon block and a conjugated diene compound block, is preferred.

The "vinyl-based aromatic hydrocarbon" means an aromatic hydrocarbon compound having a vinyl group. Specific examples thereof include styrene, o-methylstyrene, p-methylstyrene, p-tert-butylstyrene, 1,3-dimethylstyrene, α-methylstyrene, vinylnaphthalene and vinylanthracene. Particularly, styrene is preferred. These vinyl-based aromatic hydrocarbons may be used alone or in combination.

In the present invention, the conjugated diene-based polymer constituting the polar functional group-modified conjugated diene-based polymer contained as the (A) component may be a non-hydrogenated conjugated diene-based polymer or a hydrogenated conjugated diene-based polymer, and a hydrogenated conjugated diene-based polymer is more preferred.

Examples of the "non-hydrogenated conjugated diene-based polymer" include a styrene-isoprene-styrene block copolymer (also referred to as "SIS") and a styrene-butadiene-styrene block copolymer (also referred to as "SBS").

Examples of the "hydrogenated conjugated diene-based polymer" can include a hydrogenated styrene-isoprene-styrene block copolymer (that is, also referred to as the styrene-ethylene/propylene-styrene block copolymer "SEPS"), a hydrogenated styrene-butadiene-styrene block copolymer (that is, also referred to as the styrene-ethylene/butylene-styrene block copolymer "SEBS") and a hydrogenated styrene-butadiene-crystalline ethylene block copolymer (that is, also referred to as the styrene-ethylene/butylene-crystalline ethylene block copolymer "SEBC").

Among these, SEBS and/or SEBC are (is) preferred, and SEBS and/or SEBC having a styrene content of 3 to 40% by weight is more preferred for the conjugated diene-based polymer constituting the polar functional group-modified conjugated diene-based polymer contained as the (A) component.

Examples of the "polar functional group" of the "polar functional group-modified conjugated diene-based polymer" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic acid group and an amino group are more preferred.

As a method for producing the polar functional group-modified conjugated diene-based polymer, the polar functional group-modified conjugated diene-based polymer may be produced by synthesizing a conjugated diene-based polymer first, and introducing a polar functional group later, or by performing a copolymerization reaction using a monomer containing a polar functional group.

Examples of the "polar functional group-modified conjugated diene-based polymer" include amino group-modified SEBS, maleic acid group-modified SEBS and amino group-modified SEBC. In a polar functional group-modified conjugated diene-based copolymer, the position at which a polar group, such as an amino group or a maleic acid group, is introduced is not particularly limited. For example, the polar group is preferably introduced into at least one end of the conjugated diene-based copolymer.

As the polar functional group-modified conjugated diene-based copolymer, commercial products may be used. Examples thereof include Tuftec MP10 manufactured by Asahi Kasei Chemicals Corporation, DYNARON 8630P and DYNARON 4630P manufactured by JSR and Tuftec M1913 manufactured by Asahi Kasei Chemicals Corporation.

(A2) Polar Functional Group-Modified Olefin-Based Polymer

In the present invention, an "olefin-based polymer" means a polymer having a structural unit based on an olefin, and may be an olefin homopolymer or a copolymer obtained by copolymerizing a compound copolymerizable with an olefin. In the present invention, preference is given to a polyolefin-based copolymer containing an olefin in an amount of 50% by weight or more, preferably 80% by weight or more, and containing a compound copolymerizable with an olefin in an amount of less than 50% by weight, preferably less than 20% by weight. Compounds corresponding to the above "polar functional group-modified conjugated diene-based polymer" herein are not included in the "polar functional group-modified olefin-based polymer".

As the olefin, ethylene or an α-olefin having 3 to 20 carbon atoms is preferred. Examples of the α-olefin having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations thereof. While these may be used alone or in combination of two or more of these, ethylene is preferably contained as the olefin.

In the present invention, the olefin-based polymer may contain a structural unit based on a compound copolymerizable with an olefin to the extent that the object of the present invention is not impaired. Examples of the compound copolymerizable with an olefin include unsaturated carboxylic acids or derivatives thereof and vinyl carboxylates, specifically, unsaturated carboxylic acids or derivatives thereof including acrylic acid, methacrylic acid and (meth)acrylates (for example, methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, lauryl acrylate, lauryl methacrylate, stearyl acrylate, stearyl methacrylate, hydroxyethyl acrylate, hydroxyethyl methacrylate, hydroxypropyl acrylate, hydroxypropyl methacrylate, acrylates or methacrylates of polyethylene glycol and polypropylene glycol, trimethoxysilylpropyl acrylate, trimethoxysilylpropyl methacrylate, methyldimethoxysilylpropyl acrylate, methyldimethoxysilylpropyl methacrylate, methyl α-hydroxymethylacrylate, dimethylaminoethyl acrylate and dimethylaminoethyl methacrylate); and vinyl carboxylates including monofunctional aliphatic vinyl carboxylates (for example, vinyl formate, vinyl acetate, vinyl propionate, vinyl butyrate, vinyl caproate, vinyl caprylate, vinyl caprate, vinyl laurate, vinyl myristate, vinyl palmitate, vinyl stearate, isopropenyl acetate, 1-butenyl acetate, vinyl pivalate, vinyl 2-ethylhexanoate and vinyl cyclohexanecarboxylate), aromatic vinyl carboxylates (for example, vinyl benzoate and vinyl cinnamate), and polyfunctional vinyl carboxylates (for example, vinyl monochloroacetate, divinyl adipate, vinyl methacrylate, vinyl crotonate and vinyl sorbate). Among these, methyl acrylate, ethyl acrylate and methacrylic acid are preferred. These may be used alone or in combination of two or more of these.

Examples of the "polar functional group" of the "polar functional group-modified olefin-based polymer" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic anhydride group, an epoxy group, a maleic acid group and a carboxyl group are more preferred.

As a method for producing the polar functional group-modified olefin-based polymer, the polar functional group-modified olefin-based polymer may be produced by synthesizing an olefin-based polymer, and introducing a polar functional group later, or by performing a copolymerization reaction using a monomer containing a polar functional group. As the monomer containing a polar functional group, for example, glycidyl methacrylate is preferred.

Examples of the "polar functional group-modified olefin-based polymer" include an ethylene/methyl acrylate/glycidyl methacrylate copolymerized resin, an ethylene-glycidyl methacrylate-styrene copolymer, a maleic anhydride-modified polyethylene copolymer, ethylene/1-octene maleic acid copolymer and ethylene/ethyl acrylate maleic acid copolymer. In the polar functional group-modified olefin-based polymer, the position at which a polar functional group, such as an epoxy group or a maleic anhydride group, is introduced is not particularly limited. The polar functional group may be introduced into an end of the polymer or into the structural unit at inside of the polymer other than the ends of the polymer.

As the polar functional group-modified olefin-based polymer, commercial products may be used. Examples thereof include BONDFAST 7M manufactured by Sumitomo Chemical Co., Ltd., MODIPER A4100 manufactured by NOF CORPORATION, AFFINITY GA1000R manufactured by Dow Chemical Company, BONDINE HX8210 manufactured by Arkema K.K. and Fusabond N525 manufactured by DuPont.

The hot melt adhesive of the present invention may contain one (A) component alone, or two or more of them in combination. Moreover, the hot melt adhesive may contain a compound selected from the above (A1) and a compound selected from the above (A2) in combination.

In the present invention, the (A) component preferably comprises a polar functional group-modified polymer having a weight average molecular weight (Mw) of $1.0 \times 10^4$ to $3.0 \times 10^5$, and particularly preferably of $2.0 \times 10^4$ to $2.0 \times 10^5$.

The weight average molecular weight or number average molecular weight is measured by gel permeation chromatography (GPC) using a calibration curve using monodisperse molecular weight polystyrene as a standard substance to convert molecular weight.

<(B) Butyral Resin>

In the present specification, the (B) butyral resin may be a resin containing butyral group or a chemical structure derived from butyral group, and examples thereof include polyvinyl butyral resins and modified polyvinyl butyral resins. The butyral resin may contain, for example, hydroxyl group or acetic acid group (acetoxy group) in addition to butyral group. The butyral resin can be obtained, for example, by acetalization reaction of polyvinyl alcohol and butyl aldehyde (preferably n-butyl aldehyde). In this case, it is preferred that preferably 50% by mole or more, and more preferably 60% by mole or more of the hydroxyl groups of polyvinyl alcohol is substituted with butyral group; for example, a butyral resin in which 50 to 80% by mole of the hydroxyl groups of polyvinyl alcohol is substituted with butyral group may be used. Also, part or all of the hydroxyl groups not substituted with butyral group may be acetylated (may be acetoxy group). An example of structural moieties of the (B) butyral resin will be shown in the following formula (1).

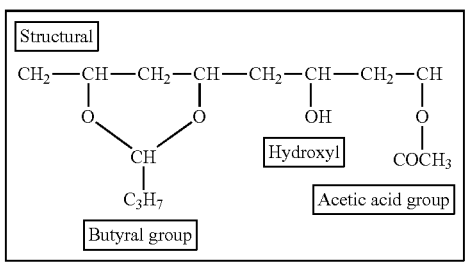

(1)

In the present invention, the butyral resin (B) has a number average molecular weight of preferably 15,000 to 200,000, more preferably 15,000 to 150,000, and further preferably 15,000 to 130,000. The adhesion of the hot melt adhesive of the present invention can be adjusted by the polymerization degree of the butyral resin. In consideration of adhesion properties, a butyral resin having a high polymerization degree is preferred, and in consideration of coating properties, a butyral resin having a low polymerization degree is preferred, which may be appropriately adjusted depending on purposes of use.

One butyral resin (B) may be used alone, or two or more of them may be used in combination.

Examples of butyral resins that can be used for the hot melt adhesive of the present invention include, for example, S-LEC B series. Examples of S-LEC B series include, for example, BL-1, BL-2, BL-3, BL-S, BX-L, BM-1, BM-2, BM-5, BM-S, BH-S, BH-3, BX-2, BX-5 and BX-55 (these all available from SEKISUI CHEMICAL CO., LTD.). Other examples of butyral resins include Mowital B14S, B16H, B20H, B30T, B30H, B45M, B45H, B60T, B60H and B75H (these all available from KURARAY CO., LTD.)

Among them, as high polymerization degree products (having a number average molecular weight of preferably 55,000 or more, more preferably 60,000 or more and 200,000 or less), BH-3 and BH-S are preferred; as middle polymerization degree products (having a number average molecular weight of preferably 35,000 or more and 70,000 or less, more preferably 38,000 or more and less than 60,000), BM-1 and BM-S are preferred; and as low polymerization degree products (having a number average molecular weight of preferably 45,000 or less, more preferably 15,000 or more and less than 38,000), BL-1 and BL-S are preferred.

<(C) Olefin-Based Polymer>

By comprising an olefin-based polymer (C), the hot melt adhesive of the present invention has improved adhesion to a polyolefin substrate, while maintaining the adhesion to a paper substrate. Having improved adhesion to a polyolefin substrate, the hot melt adhesive of the present invention may be used not only for processing paper but also for manufacturing vehicle interior material and hygienic material which are formed of polyolefin.

The olefin-based polymer (C) herein is not modified with a polar functional group. (In other words, a polymer simply described as "olefin-based polymer" means an olefin-based polymer which is not modified with a polar functional group.) Accordingly, the olefin-based polymer (C) is clearly distinguished from a polar functional group-modified olefin-based polymer (A2).

The same explanation and the specific examples of "olefin" described in "(A2) Polar functional group-modified olefin-based polymer" can also apply to the "olefin" of the olefin-based polymer (C).

In the present invention, the olefin-based polymer (C) may be either a homopolymer or a copolymer, preferably including an ethylene-based copolymer. An "ethylene-based copolymer" herein means a copolymer of ethylene and other polymerizable monomer(s).

The "other polymerizable monomer" means a monomer having a double bond between carbon atoms which enables addition polymerization with ethylene.

Specific examples of the "other polymerizable monomer" include an "olefin-based hydrocarbon except for ethylene" and a "carboxylate ester having an ethylenic double bond".

Examples of the "olefin-based hydrocarbon except for ethylene" include olefin having 3 to 20 carbon atoms, and α-olefin having 3 to 20 carbon atoms is preferred. Examples of the "olefin-based hydrocarbon except for ethylene" include propylene, 1-butene, 1-pentene, 1-hexene, 1-heptene, 1-octen, 1-nonene, 1-decene, cis-2-butene, trans-2-butene, isobutylene, cis-2-pentene, trans-2-pentene, 3-methyl-1-butene, 2-methyl-2-butene, and 2,3-dimethyl-2-butene.

Examples of the "carboxylate ester having an ethylenic double bond" include (meth)acrylate ester such as methyl (meth)acrylate, butyl (meth)acrylate, and 2-ethylhexyl (meth)acrylate, and vinyl carboxylate and allyl ester such as vinyl acetate and allyl acetate.

The "other polymerizable monomer" may be used singly or in combination of two or more.

In the present invention, the ethylene-based copolymer preferably includes a "copolymer of ethylene and an olefin except for ethylene" in view of the adhesion to a paper substrate. Accordingly, the "other polymerizable monomer" is preferably an "olefin-based hydrocarbon except for ethylene", more preferably an olefin having 3 to 20 carbon atoms, even more preferably α-olefin having 3 to 20 carbon atoms. Among these, it is preferable to include at least one selected from propylene, butene and octene.

Examples of the "copolymer of ethylene and an olefin except for ethylene" preferably specifically include a copolymer of ethylene and octene, a copolymer of ethylene, propylene and 1-butene, a copolymer of ethylene and propylene, and a copolymer of ethylene and 1-butene, more preferably a copolymer of ethylene and octene, and a copolymer of ethylene, propylene and 1-butene, and particularly preferably a copolymer of ethylene, propylene and 1-butene. The copolymers of ethylene and an olefin may be used singly or in combination. A commercialized product may be used as the copolymer of ethylene and an olefin.

Examples of the "copolymer of ethylene, propylene and 1-butene" include VESTO PLAST 703 (trade name) and VESTO PLAST 708 (trade name) made by Evonik Degussa Co., Ltd.

Examples of the "copolymer of ethylene and octene" include AFFINITY GA1900 (trade name), AFFINITY GA1950 (trade name), AFFINITY EG8185 (trade name), AFFINITY EG8200 (trade name), ENGAGE 8137 (trade name), ENGAGE 8180 (trade name), and ENGAGE 8400 (trade name) made by Dow Chemical Company.

Examples of the "copolymer of ethylene and propylene" include EASTOFLEX E1016PL-1 made by Eastman Chemical Company.

In the present invention, the ethylene-based copolymer may include a copolymer of ethylene and at least one selected from the "carboxylate ester having an ethylenic double bond", which may be a commercialized product, and may be used singly or in combination of two or more kinds.

Examples of the "copolymer of ethylene and a carboxylate ester having an ethylenic double bond" include an ethylene-vinyl acetate copolymer, an ethylene-methyl methacrylate copolymer, an ethylene-2-ethylhexyl acrylate copolymer, an ethylene-butyl acrylate copolymer, and an ethylene-butyl methacrylate copolymer. Among them, an ethylene-vinyl acetate copolymer and ethylene-methyl methacrylate copolymer are more preferred, and an ethylene-vinyl acetate copolymer is particularly preferred.

In the hot melt adhesive of the present invention, a homopolymer such as polyethylene and polypropylene may be used as the (C) component.

In the present invention, it is preferable that the (C) component contains an olefin-based polymer having a weight average molecular weight (Mw) of preferably 1000 to 150000, more preferably 2000 to 100000, and most preferably 25000 to 80000. Also, the hot melt adhesive of the present invention may contain one component (C) alone or two or more of them in combination.

<(D) Tackifier Resin>

In the hot melt adhesive of the present invention, the use of the tackifier resin (D) ((D) component) improves the pressure-sensitive adhesiveness. The "tackifier resin" is not particularly limited as long as it is generally used in hot melt adhesives and provides the hot melt adhesive targeted by the present invention.

Examples of the tackifier resin can include natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins. These tackifier resins may be used alone or in combination. For the tackifier resin, liquid type tackifier resins can also be used as long as they are colorless to pale yellow in color tone, have substantially no odor, and have good thermal stability. Considering these properties comprehensively, hydrogenated derivatives of resins and the like are preferred as the tackifier resin.

As the tackifier resin, commercial products may be used. Examples of such commercial products include MARUKACLEAR H (trade name) manufactured by Maruzen Petrochemical Co., Ltd., Clearon K100 (trade name) manufactured by YASUHARA CHEMICAL Co., Ltd., ARKON M100 (trade name) manufactured by Arakawa Chemical Industries, Ltd., I-MARV S100 (trade name), I-MARV P100 (trade name) manufactured by Idemitsu Kosan Co., Ltd., Clearon K4090 (trade name) and Clearon K4100 manufactured by YASUHARA CHEMICAL Co., Ltd., ECR5380 (trade name), ECR179EX (trade name), ECR5400 (trade name) and ECR5600 (trade name) manufactured by Exxon Mobil Corporation, Regalite R7100 (trade name) and Easttack H-100W (trade name) manufactured by Eastman Chemical Company, ECR179X (trade name) manufactured by Exxon, ARKON P100 (trade name) manufactured by Arakawa Chemical Industries, Ltd., I-marv S110 (trade name) and I-marv Y135 (trade name) manufactured by Idemitsu Kosan Co., Ltd., Easttack C100-R (trade name) manufactured by Easttack, and KR-85 (trade name) and "SUPER ESTER A-100" (trade name) manufactured by Arakawa Chemical Industries, Ltd. These commercial tackifier resins may be used singly or in combination.

<(E) Wax>

The hot melt adhesive of the present invention preferably contains a wax (E) in addition to the components (A) to (D). By comprising a wax (E), a hot melt adhesive having improved workability with reduced viscosity, adjusted open time, improved heat resistance, and reduced stringing can be obtained.

The "wax" herein means an organic substance generally called "wax", which is solid at normal temperature and forms liquid when heated, and is not specifically limited as long as having wax-like properties for obtaining the hot melt adhesive of the present invention. The wax generally has a weight-average molecular weight less than 10,000.

The wax (E) may be a wax commonly used for a hot melt adhesive which may be denatured with a polar functional group or the like, as long as the intended hot melt adhesive of the present invention can be obtained. Specific examples of the wax (E) include a synthetic wax such as a Fischer-Tropsch wax, a polyolefin wax (e.g. polyethylene wax and polypropylene wax), a petroleum wax such as paraffin wax and microcrystalline wax, and a natural wax such as castor wax.

In the present invention, the wax (E) preferably includes a Fischer-Tropsch wax. A Fischer-Tropsch wax means the wax synthesized by Fischer-Tropsch method and generally defined as a Fischer-Tropsch wax (including an acid-modified product). The Fischer-Tropsch wax is a wax fractionated from a wax including component molecules with a relatively wide distribution of the number of carbon atoms so as to include component molecules with a narrow distribution of the number of carbon atoms. Examples of the typical Fischer-Tropsch wax include SASOL H1 (trade name), SASOL H8 (trade name), SASOL H105 (trade name), and SASOL C80 (trade name), which are all available from Sasol Wax Limited.

Examples of the commercialized paraffin wax include PARAFFIN WAX-150 made by Nippon Seiro Co., Ltd.

One wax (E) may be used alone, or two or more of them may be used in combination.

When the hot melt adhesive of the present invention contains the wax, the hot melt adhesive has better stringing properties, higher thermal stability and higher adhesion strength in high temperature ranges. It is preferable that the wax has a melting point of 50 to 120° C. The melting point of wax refers to a value measured by differential scanning calorimetry (DSC). More specifically, using DSC 6220 (trade name) made by SII Nano Technology Inc., 10 mg of a sample is precisely weighed into an aluminum container, and measured at a temperature increasing rate of 10° C./minute, and the temperature at the top of the melting peak is referred to as the melting point.

The hot melt adhesive of the present invention preferably comprises a stabilizing agent (F) (hereinafter also referred to as "component (F)") in addition to the components (A) to (D).

The "stabilizer" is blended to prevent reduction of molecular weight by heating, gelation, coloration, generation of an odor and the like in the hot melt adhesive to improve the stability of the hot melt adhesive. The "stabilizer" is not particularly limited as long as the hot melt adhesive targeted by the present invention can be obtained. Examples of the "stabilizer" include an antioxidant and an ultraviolet absorbing agent.

The "ultraviolet absorbing agent" is used to improve the light resistance of the hot melt adhesive. The "antioxidant" is used to prevent the oxidative degradation of the hot melt adhesive. The antioxidant and the ultraviolet absorbing agent are not particularly limited, and can be used as long as the targeted paper product described later can be obtained.

Examples of the antioxidant include phenol-based antioxidants, sulfur-based antioxidants and phosphorus-based antioxidants. Examples of the ultraviolet absorbing agent include benzotriazole-based ultraviolet absorbing agents and benzophenone-based ultraviolet absorbing agents. Further, a lactone-based stabilizer may also be added. These may be used alone or in combination. As commercial products of antioxidants, the following products may be used.

Specific examples thereof include SUMILIZER GM (trade name), SUMILIZER TPD (trade name) and SUMILIZER TPS (trade name) manufactured by Sumitomo Chemical Co., Ltd., IRGANOX 1010 (trade name), IRGANOX HP2225FF (trade name), IRGAFOS 168 (trade name), IRGANOX 1520 (trade name) and TINUVIN P manufactured by Ciba Specialty Chemicals, JF77 (trade name) manufactured by Johoku Chemical Co., Ltd., TOMINOX TT (trade name) manufactured by API Corporation and AO-4125 (trade name) manufactured by ADEKA CORPORATION. These stabilizers may be used alone or in combination.

The hot melt adhesive of the present invention may further comprise a fine particle filler. The fine particle filler may be a generally used one, and is not particularly limited as long as the hot melt adhesive targeted by the present invention can be obtained. Examples of the "fine particle filler" include mica, calcium carbonate, kaolin, talc, titanium oxide, diatomaceous earth, urea-based resins, styrene beads, fired clay and starch. The shape of these is preferably a spherical shape, and their sizes (diameter in the case of a spherical shape) are not particularly limited.

The hot melt adhesive according to the present invention may be produced by blending the (A) component, the (B) component, the (C) component and the (D) component, and as required, the (E) component, the component (F) and various additives, using a generally known method for producing a hot melt adhesive. For example, the hot melt adhesive according to the present invention may be produced by blending predetermined amounts of the above-described components, and heating and melting them. The order of adding the components, the heating method and the like are not particularly limited as long as the targeted hot melt adhesive is obtained.

In an embodiment of the present invention, blending ratio of each component is preferably as follows.

In the hot melt adhesive of the present invention, the (A) component is blended preferably in an amount of 1 to 15 parts by weight, more preferably 1 in an amount of to 10 parts by weight based on 100 parts by weight of the total weight of the components (A) to (E). The (B) component is blended preferably in an amount of 10 to 50 parts by weight, more preferably in an amount of 15 to 40 parts by weight based on 100 parts by weight of the total weight of the components (A) to (E). The (C) component is blended preferably in an amount of 5 to 40 parts by weight, more preferably in an amount of 5 to 30 parts by weight, and most preferably in an amount of 5 to 20 parts by weight based on 100 parts by weight of the total weight of the components (A) to (E). The blending ratio of the (D) component is preferably 5 to 70 parts by weight, more preferably 10 to 60 parts by weight, and most preferably 15 to 40 parts by weight based on 100 parts by weight of the total amount of the components (A) to (E).

The (E) component is blended preferably in an amount of 10 to 50 parts by weight, more preferably in an amount of 10 to 40 parts by weight, and most preferably in an amount of 15 to 30 parts by weight based on 100 parts by weight of the total weight of the components (A) to (E).

When the (F) component is added to the hot melt adhesive of the present invention, preferably 0.1 to 2.0 parts by weight, more preferably 0.5 to 1.5 parts by weight of the (F) component is added based on 100 parts by weight of the total weight of the components (A) to (E).

In a more preferable embodiment of the present invention, the hot melt adhesive has a viscosity (or melt viscosity) at 150° C. of preferably 5,000 mPa·s or less, particularly preferably 3000 mPa·s or less, and most preferably 2000 mPa·s or less.

The viscosity which permits homogeneous application of a hot melt adhesive is 5000 mPa·s or less, and the viscosity which facilitates homogeneous application of a hot melt adhesive is less than 2000 mPa·s. When a hot melt adhesive has a viscosity at 150° C. in the above range, the hot melt adhesive is much more suitable for coating. The viscosity (or melt viscosity) at 150° C. in the present specification means a value measured by a Brookfield viscometer using a rotor No. 27.

The hot melt adhesive of the present invention may be in various shapes, generally in a block shape or a film (sheet) shape at normal temperature. The block shape may be obtained by directly cooling and solidifying a product obtained by the manufacturing method, while the film (sheet) shape may be obtained by further forming the product obtained by the manufacturing method into a film shape.

The hot melt adhesive of the present invention may be applied to an adherend for use. No organic solvent is required to be blended in the hot melt adhesive when applied, resulting in an environmentally preferable adhesive.

The method for applying the hot melt adhesive is not particularly limited and generally known method for applying (or coating with) a hot melt adhesive may be used. Such application methods may be broadly divided into contact application and noncontact application. The "contact application" refers to an application method in which an ejection machine is brought into contact with a member or a film when the hot melt adhesive is applied. The "noncontact application" refers to an application method in which an ejection machine is not brought into contact with a member or a film when the hot melt adhesive is applied. Examples of the contact application method include slot coater coating and roll coater coating. Examples of the noncontact application method can include spiral coating which allows coatings in the form of a spiral, omega coating and control seam coating which allows coatings in the form of a wave, slot spray coating and curtain spray coating which allows coatings in the form of a plane, and dot coating which allows coatings in the form of dots, bead coating which allows coating in the form of a line.

By the above application methods, the hot melt adhesive of the present invention is applied to various substrates at about 150° C.

The hot melt adhesive of the present invention is widely applicable in, for example, electronic components, woodworking, construction materials, hygienic materials, and paper products. The hot melt adhesive of the present invention can be suitably used in manufacturing paper products, and is particularly useful as hot melt adhesive for paper products.

The paper product of the present invention is a paper product which is manufactured using the hot melt adhesive. The types of the paper products are not specifically limited as long as the hot melt adhesive is used in manufacturing, specifically including, for example, book binding, calendars, corrugated cardboards, and cartons.

One preferred embodiment of paper products of the present invention is a carton (coated carton), the surface of which is coated with an agent for imparting high-grade feeling to a packaging of products.

EXAMPLES

For the purpose of describing the present invention in more details and more specifically, the present invention will be described below using Examples. These Examples are for describing the present invention, and do not limit the present invention in any way.

Components blended in hot melt adhesives are shown below.

<(A) Polar Functional Group-Modified Copolymers>
(A1) Polar functional group-modified conjugated diene-based copolymers
 (A1-1) amino group-modified SEBS ("DYNARON 8630P" manufactured by JSR, weight-average molecular weight 100000)
 (A1-2) amino group-modified SEBC ("DYNARON 4630P" manufactured by JSR, weight-average molecular weight 200000)
(A2) Polar functional group-modified olefin-based polymers
 (A2-1) Ethylene/methyl acrylate/glycidyl methacrylate copolymerized resin ("BONDFAST 7M" (trade name) manufactured by Sumitomo Chemical Co., Ltd., weight-average molecular weight 140000)
 (A2-2) Ethylene/1-octene maleic acid copolymer ("AFFINITY GA1000R" made by Dow Chemical Company, weight-average molecular weight 30000)
 (A2-3) Ethylene/ethyl acrylate maleic acid copolymer ("BONDINE HX8210" made by Arkema K.K., weight-average molecular weight 80000)
<(B) Butyral Resin>
(B1) Polyvinyl butyral resin ("S-LEC B BL-1" available from SEKISUI CHEMICAL CO., LTD., number average molecular weight 19,000)
(B2) Polyvinyl butyral resin ("S-LEC B BM-1" available from SEKISUI CHEMICAL CO., LTD., number average molecular weight 40,000)
(B3) Polyvinyl butyral resin ("S-LEC B BH-3" available from SEKISUI CHEMICAL CO., LTD., number average molecular weight 110,000)
<(C) Olefin-Based Polymer>
(C1) Propylene/ethylene/1-butene copolymer ("VESTOPLAST 703" available from Evonik Degussa GmbH, weight average molecular weight 34000)
(C2) Ethylene/octene copolymer ("AFFINITY GA1950" available from The Dow Chemical Company, weight average molecular weight 30000)
(C3) Ethylene/vinyl acetate copolymer ("Ultrathene 722" available from Tosoh Corporation, weight average molecular weight 60000)
(C4) Ethylene/methyl methacrylate polymer ("Acryft CM5022" available from Sumitomo Chemical Co., Ltd., weight average molecular weight 35000)
(C5) Polypropylene ("L-MODU S400" available from Idemitsu Kosan Co., Ltd., weight average molecular weight 40000)
(C6) Polyethylene ("Petrothene 249" available from Tosoh Corporation)
<(D) Tackifier Resin>
(D1) Hydrogenated derivative of aromatic petroleum hydrocarbon resin ("I-MARV P125" available from Idemitsu Kosan Co., Ltd.)
(D2) Hydrogenated derivative of aromatic petroleum hydrocarbon resin ("I-MARV S100" available from Idemitsu Kosan Co., Ltd.)
(D3) Rosin ester ("SUPER ESTER A-100" available from Arakawa Chemical Industries, Ltd.)
<(E) Wax>
(E1) Paraffin wax ("Paraffin Wax 150" available from NIPPON SEIRO CO., LTD.)
(E2) Maleic acid-modified Fischer-Tropsch wax ("Sasol H105" available from Sasol Limited)
(E3) Fischer-Tropsch wax ("Sasol H1" available from Sasol Limited)
<(F) Stabilizing Agent>
(F1) Antioxidant ("AO-60" available from ADEKA CORPORATION)

These components were blended in a proportion (part(s) by weight) shown in Table 1 to Table 3, melted and mixed at about 160° C. over about 3 hours using a universal stirrer to prepare hot melt adhesives of Examples 1 to 18 and Comparative Examples 1 to 4. The numerical values for the composition (blend) of the hot melt adhesives shown in Table 1 to Table 3 are all in part(s) by weight.

Thermal stability, adhesion to various substrate materials and stringing properties of each hot melt adhesive of Examples and Comparative Examples were evaluated. The results are shown in Table 1 to Table 3. In the following, each evaluation will be summarized.

<Adhesion: Coated Carton>
(Sample Preparation)

A hot melt adhesive melted at 150° C. was applied to a carton having the surface coated with an agent. The application amount was 2 g/m.

The cartons were laminated under conditions with a setting time of 1 second, an open time of 1 second, and a pressing pressure of 1 kg/25 cm$^2$. The lamination was cut into a sample with a length of 5 cm and a width of 2.5 cm for evaluation.
(Evaluation Method)

The prepared sample was aged in a thermostatic chamber set at 23° C. with a humidity of 50% for 24 hours, and then the laminated cartons were forcibly detached by hand under the same atmosphere. The proportion of broken area to the entire adhesion area of the carton was defined as material breakage rate, and the state of breakage was evaluated.
⊙⊙: Material breakage rate was more than 80%.
○: Material breakage rate was 65 to 80%.
x: Material breakage rate was less than 65%.
<Adhesion: Corrugated Cardboard>
(Sample Preparation)
A hot melt adhesive melted at 150° C. was applied to K liner corrugated cardboards with an application amount of 2 g/m, and the corrugated cardboards were laminated under conditions with a setting time of 10 seconds, an open time of 3 seconds, and a pressing pressure of 1 kg/25 cm². The lamination was cut into a sample with a length of 5 cm and a width of 2.5 cm for evaluation.
(Evaluation Method)
The prepared sample was aged in a thermostatic chamber set at 23° C. with a humidity of 50% for 24 hours, and then forcibly detached by hand under the same atmosphere. The proportion of broken area to the entire adhesion area of K liner corrugated cardboard was defined as material breakage rate (proportion of broken material), and the state of breakage was evaluated.
⊙⊙: Material breakage rate was more than 80%.
○: Material breakage rate was 60% to 80%.
Δ: Material breakage rate was 40% or more and less than 60%.
x: Material breakage rate was less than 40%.
<Adhesion: PET>
(Sample Preparation)
A hot melt adhesive melted at 150° C. was applied to a polyethylene terephthalate (PET) film. The application amount was 2 g/m.
The PET films were laminated under conditions with a setting time of 1 second, an open time of 1 second, and a pressing pressure of 1 kg/25 cm². The lamination was cut into a sample with a length of 5 cm and a width of 2.5 cm for evaluation.
(Evaluation Method)
The prepared sample was aged in a thermostatic chamber set at 23° C. with a humidity of 50% for 24 hours, and then a 90° peel test was performed under the same atmosphere with a tensile tester.
⊙⊙: 1 kg/inch or more
○: 0.5 kg/inch or more and less than 1 kg/inch
x: less than 0.5 kg/inch
<Stringing Properties>
A hot melt adhesive was intermittently applied to an adherend disposed 20 cm away in vertical direction from the tip of a hot melt gun. The state of a falling object between the hot melt gun and the adherend was visually observed for evaluation of stringing properties.
(Measurement Conditions)
Temperature setting: 150° C. for all of tank, hose, and nozzle
Nozzle diameter: 14/1000 inch
Nozzle: 1-orifice (number of discharging port: 1) and 4-orifice (number of discharging port: 4)
Application pressure: 0.4 MPa
Application shot number: 350 shots/5 minutes for 1-orifice, and 70 shots/1 minute for 4-orifice
⊙⊙: Falling objects were in particle form.
○: Falling objects were mostly in particle form and sparsely in string form.
Δ: Falling objects were mixed in particle form and in string form.
x: Falling objects were in string form.

<Thermal Stability>
The thermal stability was visually determined by a change in appearance after 20 g of the hot melt adhesive was placed in a 70 mL glass bottle and allowed to stand in a dryer oven at 150° C. for 72 hours.
⊙⊙: Phase separation, carbonized product or ring (a degraded product of the hot melt adhesive deposited in a ring shape) was not observed.
○: Phase separation, carbonized product and a ring were very slightly observed.
Δ: Phase separation, carbonized product and a ring were slightly observed.
x: Phase separation, carbonized product and a ring were observed.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| (A1-1) |  |  |  |  |  |  |  | 3 |
| (A1-2) | 3 | 3 | 3 | 3 |  |  |  |  |
| (A2-1) |  |  |  |  | 3 |  |  |  |
| (A2-2) | 5 | 5 |  |  |  | 10 |  | 5 |
| (A2-3) |  |  |  |  |  |  | 3 |  |
| (B1) | 30 | 30 | 30 | 30 | 30 | 30 | 25 | 30 |
| (B2) |  |  |  |  |  |  |  |  |
| (B3) |  |  |  |  |  |  |  |  |
| (C1) |  | 10 |  |  |  |  |  |  |
| (C2) | 10 |  |  |  | 10 | 10 | 15 | 10 |
| (C3) |  |  |  |  |  |  |  |  |
| (C4) |  |  |  |  |  |  |  |  |
| (C5) |  |  | 15 |  |  |  |  |  |
| (C6) |  |  |  | 15 |  |  |  |  |
| (D1) | 12 | 12 | 12 | 20 |  |  |  | 20 |
| (D2) | 10 | 10 | 10 | 12 | 37 | 30 | 37 | 12 |
| (D3) | 10 | 10 | 10 |  |  |  |  |  |
| (E1) |  |  |  |  |  |  |  |  |
| (E2) |  |  |  |  |  |  |  |  |
| (E3) | 20 | 20 | 20 | 20 | 20 | 20 | 20 | 20 |
| (F1) | 0.9 | 0.9 | 0.9 | 0.9 | 0.9 | 0.9 | 0.9 | 0.9 |
| total (parts by weight) | 100.9 | 100.9 | 100.9 | 100.9 | 100.9 | 100.9 | 100.9 | 100.9 |
| Adhesion Property (corrugated cardboard) | ⊙⊙ | ⊙⊙ | ⊙⊙ | ⊙⊙ | ○ | ⊙⊙ | ○ | ⊙⊙ |
| Adhesion Property (coated carton) | ⊙⊙ | ⊙⊙ | ⊙⊙ | ⊙⊙ | ○ | ⊙⊙ | ○ | ⊙⊙ |
| Adhesion Property (PET) | ⊙⊙ | ⊙⊙ | ○ | ○ | ○ | ○ | ○ | ○ |
| Stringing Property | ○ | ○ | ○ | ○ | ○ | ○ | ○ | ○ |
| Thermal Stability (150° C. × 72 hours) | ⊙⊙ | ⊙⊙ | ○ | ○ | ○ | ○ | ○ | ⊙⊙ |

Ex. = Example

TABLE 2

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| (A1-1) |  |  |  |  |  |  |  |  |
| (A1-2) | 3 | 3 | 3 | 3 | 3 | 3 | 3 | 3 |
| (A2-1) |  |  |  |  |  |  |  |  |
| (A2-2) | 10 | 5 | 5 | 5 | 5 | 5 |  |  |
| (A2-3) |  |  |  |  |  |  |  |  |
| (B1) | 35 | 30 | 30 | 38 |  |  | 20 | 10 |
| (B2) |  |  |  |  |  | 30 |  |  |

TABLE 2-continued

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| (B3) |  |  |  |  |  | 20 |  |  |
| (C1) |  |  |  |  |  |  |  |  |
| (C2) | 10 | 10 | 10 | 8 | 10 | 10 | 25 | 35 |
| (C3) |  | 2 |  |  |  |  |  |  |
| (C4) |  |  | 2 |  |  |  |  |  |
| (C5) |  |  |  |  |  |  |  |  |
| (C6) |  |  |  |  |  |  |  |  |
| (D1) | 22 | 10 | 10 | 13 | 20 | 25 | 25 | 25 |
| (D2) |  | 10 | 10 | 8 | 12 | 17 | 12 | 12 |
| (D3) |  |  | 10 | 10 |  |  |  |  |
| (E1) |  |  |  |  |  |  |  |  |
| (E2) |  |  |  |  |  |  |  |  |
| (E3) | 20 | 20 | 20 | 25 | 20 | 20 | 15 | 15 |
| (F1) | 0.9 | 0.9 | 0.9 | 0.9 | 0.9 | 0.9 | 0.9 | 0.9 |
| total (parts by weight) | 100.9 | 100.9 | 100.9 | 100.9 | 100.9 | 100.9 | 100.9 | 100.9 |
| Adhesion Property (corrugated cardboard) | ○ | ○○ | ○○ | ○○ | ○○ | ○○ | ○○ | ○○ |
| Adhesion Property (coated carton) | ○ | ○○ | ○○ | ○○ | ○○ | ○○ | ○○ | ○○ |
| Adhesion Property (PET) | ○ | ○○ | ○ | ○○ | ○ | ○ | ○○ | ○○ |
| Stringing Property | ○ | ○○ | ○○ | ○ | ○ | ○ | ○○ | ○○ |
| Thermal Stability (150° C. × 72 hours) | ○ | ○○ | ○○ | ○○ | ○ | ○ | ○○ | ○○ |

Ex. = Example

TABLE 3

|  | Ex. 17 | Ex. 18 | Com-Ex. 1 | Com-Ex. 2 | Com-Ex. 3 | Com-Ex. 4 |
|---|---|---|---|---|---|---|
| (A1-1) |  |  |  |  |  |  |
| (A1-2) | 3 | 3 |  | 5 | 5 | 5 |
| (A2-1) |  |  |  |  |  |  |
| (A2-2) | 5 | 5 |  |  |  |  |
| (A2-3) |  |  |  |  |  |  |
| (B1) | 30 | 30 | 30 |  | 25 | 25 |
| (B2) |  |  |  |  |  |  |
| (B3) |  |  |  |  |  |  |
| (C1) |  |  |  |  |  |  |
| (C2) | 15 | 15 | 10 | 35 |  | 15 |
| (C3) |  |  |  |  |  |  |
| (C4) |  |  |  |  |  |  |
| (C5) |  |  |  |  |  |  |
| (C6) |  |  |  |  |  |  |
| (D1) | 20 | 20 | 40 | 40 | 50 |  |
| (D2) | 7 | 7 |  |  |  |  |
| (D3) |  |  |  |  |  |  |
| (E1) | 10 |  |  |  |  |  |
| (E2) |  | 10 |  |  |  |  |
| (E3) | 10 | 10 | 20 | 20 | 20 | 55 |
| (F1) | 0.9 | 0.9 | 0.9 | 0.9 | 0.9 | 0.9 |
| total (parts by weight) | 100.9 | 100.9 | 100.9 | 100.9 | 100.9 | 100.9 |
| Adhesion Property (corrugated cardboard) | ○○ | ○○ | x | ○ | x | x |
| Adhesion Property (coated carton) | ○○ | ○○ | x | x | x | x |
| Adhesion Property (PET) | ○○ | ○ | x | x | x | x |
| Stringing Property | ○ | ○ | x | x | ○ | ○ |
| Thermal Stability (150° C. × 72 hours) | ○○ | ○○ | ○ | ○ | x | x |

Ex. = Example
Com-Ex. = Comparative Example

As shown in Tables 1 to 3, the hot melt adhesives of Examples 1 to 18 contain all of the four components of (A) component, the (B) component, the (C) component and the (D) component, and therefore have reduced stringing, and have excellent adhesion not only to PET films but also to paper substrates such as cartons and cardboards. Further, since the components of the hot melt adhesives of Examples 1, 2, 8, 10 to 12, 15 to 18 are compatible with each other, the hot melt adhesives also have excellent thermal stability.

As shown in Table 3, the hot melt adhesives of Comparative Examples 1 to 4 lack any of the (A) component, the (B) component, the (C) component or the (D) component, and therefore have poorer adhesion, smaller reduction of stringing or lower thermal stability than those of the hot melt adhesives of Examples.

INDUSTRIAL APPLICABILITY

The present invention provides a hot melt adhesive and a paper product to which the hot melt adhesive is applied. Among the paper products, the present invention is particularly effective in products made from thick paper such as corrugated cardboards and cartons.

The invention claimed is:

1. A hot melt adhesive comprising:
   (A) 1-15 wt % of a polar functional group-modified conjugated diene-based polymer;
   (B) 10-50 wt % of a butyral resin;
   (C) 5-40 wt % of an olefin-based polymer;
   (D) 5-70 wt % of a tackifier resin; and
   (E) 10-40 wt % of a wax.

2. The hot melt adhesive of claim 1, wherein the polar functional group-modified conjugated diene-based polymer contains a conjugated diene compound selected from the group consisting of is 1,3-butadiene, 2-methyl-1,3-butadiene, 2,3-dimethyl-1,3-butadiene, 1,3-pentadiene and 1,3-hexadiene.

3. The hot melt adhesive of claim 1, wherein the polar functional group of the polar function group-modified conjugated diene-based polymer is selected from the group consisting of a maleic anhydride group, a carboxyl group, a maleic acid group, an amino group, an imino group, an alkoxysilyl group, a silanol group, a silyl ether group, a hydroxyl group and an epoxy group.

4. A paper product comprising the hot melt adhesive of claim 1.

\* \* \* \* \*

UNITED STATES PATENT AND TRADEMARK OFFICE
CERTIFICATE OF CORRECTION

PATENT NO. : 10,190,027 B2
APPLICATION NO. : 16/106846
DATED : January 29, 2019
INVENTOR(S) : Ai Takamori It is certified that error appears in the above-identified patent and that said Letters Patent is hereby corrected as shown below:

In the Specification

Column 11, Line 43: Change "AO-4125" to "AO-412S".

Signed and Sealed this
Thirty-first Day of March, 2020

Andrei Iancu
*Director of the United States Patent and Trademark Office*